United States Patent [19]

Gray

[11] 4,031,654
[45] June 28, 1977

[54] INSECT TRAP

[76] Inventor: James R. Gray, P.O. Box 5094, Little Rock, Ark. 72205

[22] Filed: Jan. 26, 1976

[21] Appl. No.: 652,383

[52] U.S. Cl. .................................. 43/114
[51] Int. Cl.² .......................... A01M 1/14
[58] Field of Search ........................ 43/114

[56] References Cited

UNITED STATES PATENTS

| 1,112,064 | 9/1914 | Gordon | 43/114 |
| 3,755,958 | 9/1973 | Bradshaw | 43/114 |

FOREIGN PATENTS OR APPLICATIONS

| 173,564 | 7/1906 | Germany | 43/114 |

Primary Examiner—Russell R. Kinsey
Assistant Examiner—Daniel J. Leach

[57] ABSTRACT

An insect trap in the form of an inclining surface under which insects or other small pests are lured for their control or destruction. The underside of the inclining surface is coated with an adhesive, contains an insect attractant, and converges toward the plane of the floor or surface upon which insects travel. The incline and spacing of the adhesive surface to the surface of travel is such that insects or other small pests in search of the attractant source may move under the adhesive surface at the high end of the incline, but cannot avoid contacting their back or other large upper body area to, and becoming immobilized on, the adhesive surface when they try to move under a lower portion of the incline.

16 Claims, 7 Drawing Figures

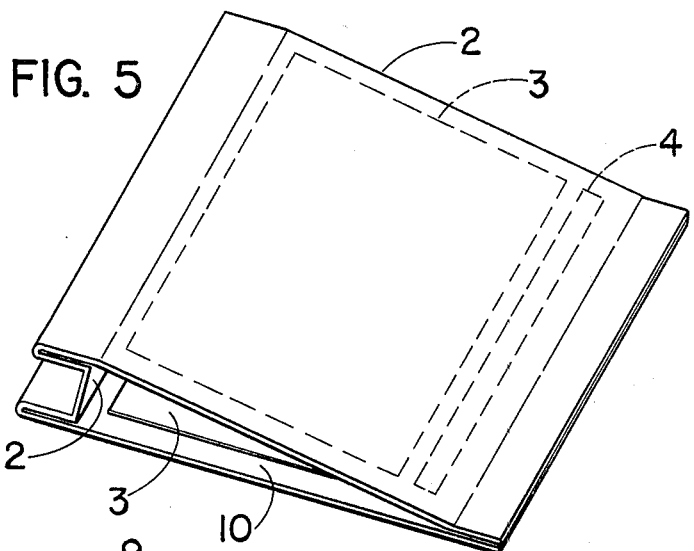
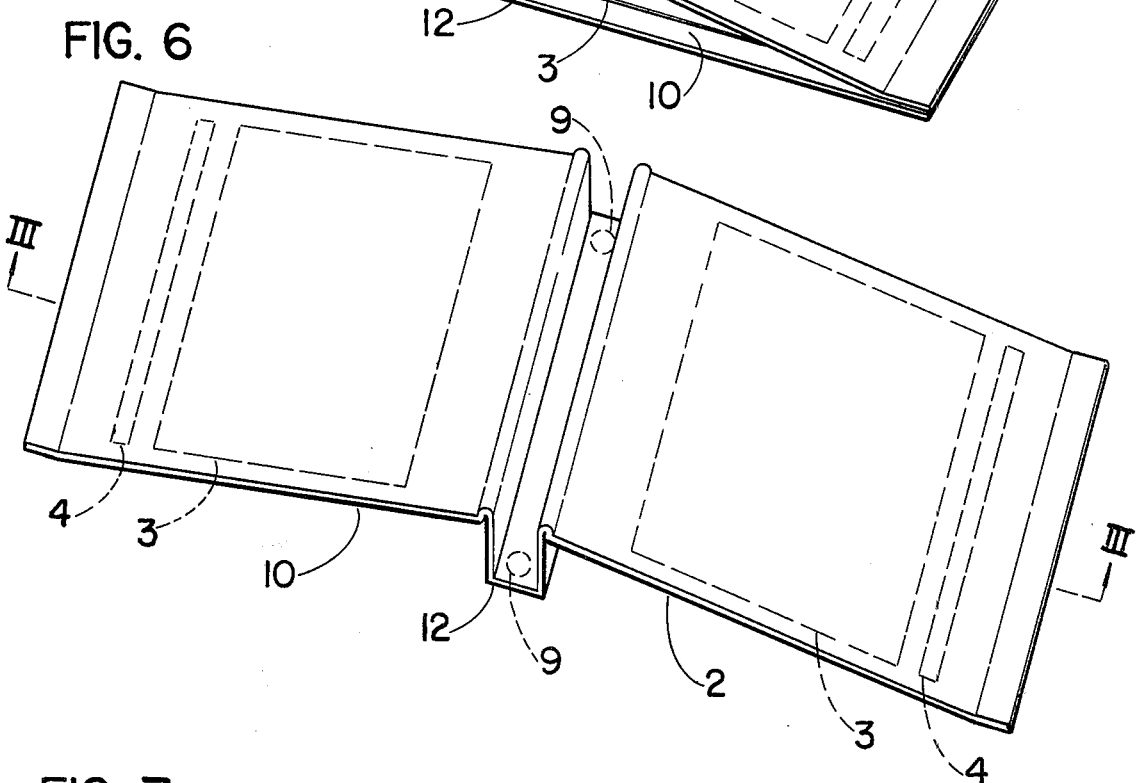
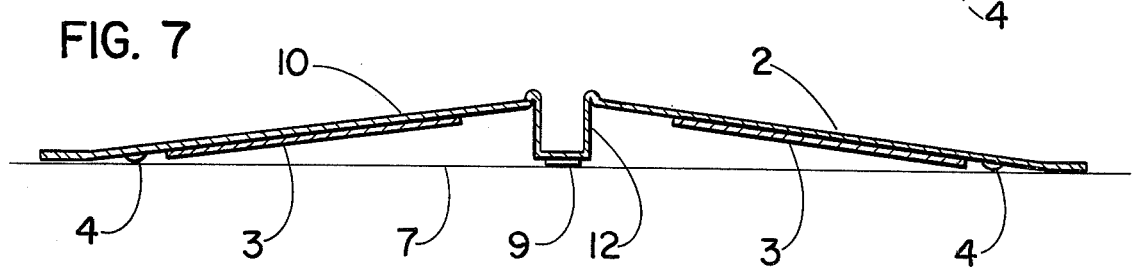

INSECT TRAP

BACKGROUND OF THE INVENTION

This invention relates in general to insect or pest control devices. More specifically, the invention relates to a device for attracting and trapping insects or other pests on an adhesive surface.

Various means have been used to control and destroy detrimental insects, worms, and the like. Such known methods have utilized various means, among them solid, vapor, and liquid toxicants, attractant substances, traps and the like to lure and/or kill the pests. These prior art pest control methods have been found to be deficient in achieving an optimum level of efficiency. For example, the mere spraying of an insecticide in the general area in which insects are to be controlled results in the use of large amounts of toxic substances to kill insects with only a random chance of contact. Not only is such a technique obviously wasteful, but also presents safety and environmental hazards to humans and animal life.

Known insect control devices for attracting and trapping insects with an adhesive depend primarily on contact with the insect's tarsus (feet) to effect immobility. This provides a very small area of contact between the insect and adhesive, and larger or stronger insects can simply walk through the adhesive. This problem is intensified in lower or higher than normal temperatures, or in dusty atmospheres, which cause adhesives to lose their optimum tack and strength. Currently, the only method of combatting the escape of insects from an adhesive trap is to provide a much larger area of adhesive than needed in an effort to exhaust the pests before they can crawl through the adhesive. Because of this, current adhesive traps have limited overall effectiveness and their structures are unnecessarily large, unhandy and expensive.

Therefore, it is an object of this invention to provide an adhesive pest trap with improved ability to immobolize both large and small pests.

A further object of this invention is to provide an adhesive pest trap with improved effectiveness under adverse conditions such as temperature extremes or dusty atmospheres.

Still another object of this invention is to provide an effective adhesive pest trap of minimum size and cost.

A still further object of this invention is to provide an adhesive pest trap that can be securely attached in an unobtrusive manner within the dwelling or area of its use.

Yet another object of this invention is to provide an adhesive pest trap which attracts insects in the area of use to enter and become caught in the trap.

BRIEF SUMMARY OF THE INVENTION

The foregoing and other objects are attained in accordance with the present invention wherein there is provided an improved insect trap which attracts insects or other pests for their control or destruction. The improved insect trap disclosed herein includes an adhesive coated surface placed at an inclined plane with any surface upon which insects travel, and from which an alluring vapor is put forth, or other attractant means used, to entice insects to crawl between the inclined adhesive surface and their surface of travel, and inadvertently contact the adhesive with their back or top body section.

The contact of adhesive to the insect's back is achieved by placing the adhesive surface over the surface of insect travel at a degree of incline and spacing which allows insects to move between the two surfaces at the higher end of the incline, but not the lower end, without contacting the adhesive. Thus, an insect in search of the attractant and attempting to move under the adhesive surface from the higher to lower portion of incline will contact the adhesive surface with its back or upper body section.

The strength of any adhesive material is directly proportional to the square area of its contact, and devices of the present invention which contact the insect's back with adhesive have been found to provide 10 to 100 times the holding power of that achieved with devices which use adhesive to foot contact. Because of this improved holding power, it is virtually impossible for an insect to escape or even move from the initial point of contact with the adhesive surface, even under poor temperature or dust conditions.

Thus, insect traps of the present invention achieve significantly improved effectiveness and in addition may be economically manufactured in unobtrusive sizes and shapes for placement on, or attachment to, any desired surface.

BRIEF DESCRIPTION OF THE DRAWINGS

Further objects of the invention, together with additional features contributing thereto and advantages accruing therefrom will be apparent from the following description of several embodiments of the invention when read in conjunction with the accompanying drawings, wherein:

FIG. 5 is a perspective illustration of an additional embodiment of the insect trap of the invention which may be used in the small folded condition shown or unfolded and used when additional adhesive surface is required;

FIG. 6 is a perspective illustration showing the insect trap of FIG. 5 unfolded to extend an additional inclined surface under which insects may be enticed to crawl and contact an adhesive layer; and FIG. 7 is a side cross-sectional illustration taken along line III—III of the insect trap of FIG. 6 and showing the insect trap in place on its surface of use.

Numeral references are employed to indicate the various parts shown in the drawings and like numerals indicate like parts throughout the various figures and embodiments shown.

DETAILED DESCRIPTION

Figure 1:
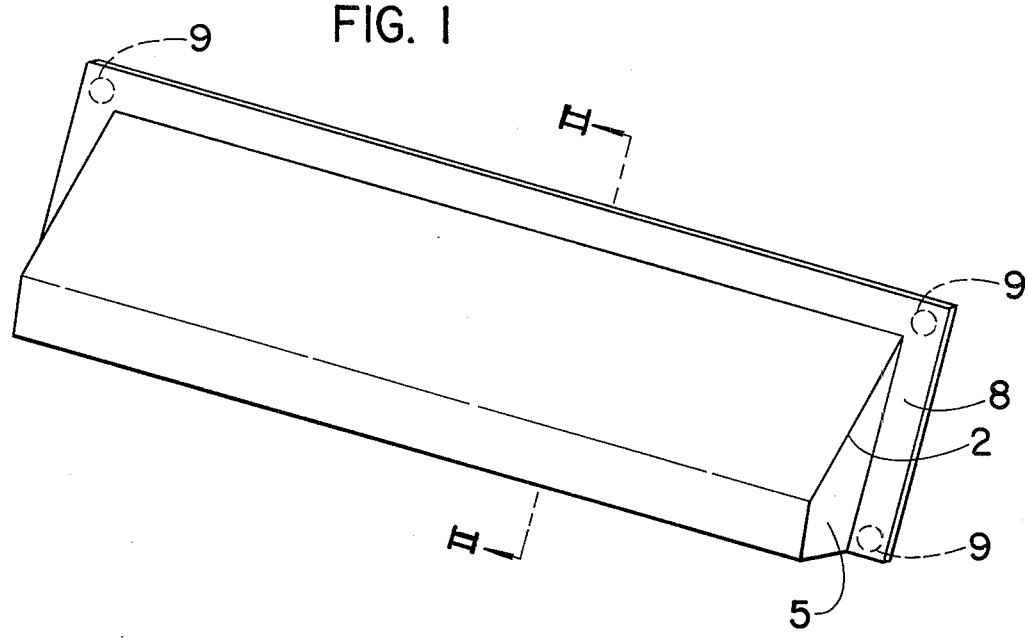
FIG. 1 is a perspective illustration of an embodiment of the insect trap of the present invention.
Figure 2:
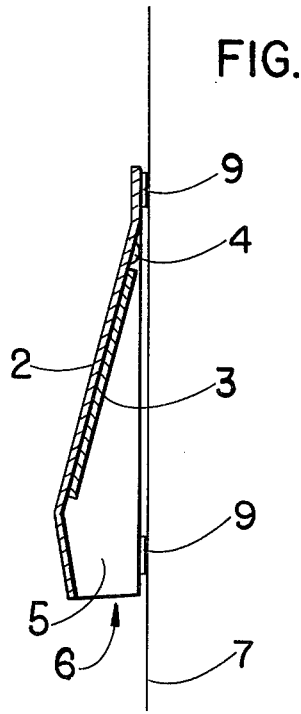
FIG. 2 is an enlarged side cross-sectional illustration taken along line II—II of the insect trap of FIG. 1.

Referring now to FIGS. 1 and 2, an embodiment of the invention is illustrated which may be inexpensively formed from plastic or other suitable material and includes a sloping panel 2 which converges toward any mounting surface 7, such as a wall or floor, upon which the structure is laid or attached. A layer of adhesive material 3, and a pest attractant means 4, is applied to the underside of sloping panel 2 in such a manner that target insects or pests in the general vicinity of the structure are enticed to crawl or fly under the high side of sloping panel 2 in an attempt to gain access to attractant means 4, but instead, because of the declining space between sloping panel 2 and surface 7, contact adhesive material 3 with their back or upper body and are stuck to sloping panel 2 at the point of contact.

Adhesive material 3 may be any substance capable of adhering target insects or pests to sloping panel 2, and may be applied in a coating or other orientation to part or all of the underside of sloping panel 2 as circumstances dictate. One example of many substances capable of the cohesion neeeded by adhesive material 3 is a mixture of 97% polybutenes and 3% hydrogenated castor oil. Many other suitable adherents are available and a variety of substances, such as a mixture of 8 parts rosin, 4 parts rapeseed oil, and 1 part honey, can serve not only the adhesive function but in addition act as an attractant and therefore supplement or even eliminate additional attractant means 4. Under certain manufacturing conditions it may be desirable to apply adhesive material 3 to sloping panel 2 in dots, strips, or other broken patterns to reduce cost. Under certain use conditions it may be desirable to apply adhesive material 3 to only a portion of the underside of sloping panel 2 in order to reduce costs, or in order to trap insects only after they are far enough under sloping panel 2 to hide them from view.

Attractant means 4 may be any means or substance capable of enticing target insects or pests to move under sloping panel 2, and the particular attractant used will depend upon the type of insects or pests to be trapped and other factors such as use conditions. For example, colors may be used to attract some insect species, or in other cases the natural desire of some insects to crawl and hide in closely confined spaces may be used to lure them under sloping panel 2 and in contact with adhesive material 3. In other cases attractant substances such as sex pheromones, arrestants, or food materials may be used. A wide variety of well known attractant substances of these types are available, for example, Gyplure for the gypsy moth, feather meal hydrolyzate for the housefly, and peanut butter for the cockroach (no limitations to any particular attractant substance is intended by these examples). Many attractant materials attract more than one type of insect, and in addition several attractants may be mixed together to attract and trap a variety of insects in a single structure of the invention. Attractant means 4 may be applied under sloping panel 2 in any operationally sound location, or when applicable may be mixed with or applied directly to adhesive material 3.

If the material from which sloping panel 2 is produced is flexible, or if use conditions are such that sloping panel 2 may be struck and knocked out of alignment with mounting surface 7, spacers 5 may be placed between the two surfaces to strengthen the structure and maintain the proper opening as indicated by numeral 6 through which insects may move between sloping panel 2 and mounting surface 7. Additionally, spacers 5 may be formed to limit access under sloping panel 2 to a desired location, such as along the higher edge of sloping panel 2.

If it is desirable to secure the insect trap embodiment of FIGS. 1 and 2 to mounting surface 7 a suitable attachment means 9, for example, double sided tape, may be applied to sloping panel 2 and/or, if spacers 5 are used, to spacers 5 in a location that contacts both the trap structure and mounting surface 7. Optionally a flange 8 may be added to the base of spacers 5 and/or sloping panel 2 to facilitate use of attachment means 9.

The embodiment of FIGS. 1 and 2 is shown open on the side contacting mounting surface 7. It is within the scope of the invention to add a cover piece over the open side to protect the adhesive and attractant during storage and/or form a surface onto which attachment means may be applied during use. Additionally, the cover piece may be extended past the opening at numeral 6 in a manner which, when the trap is suspended with string, etc., allows flying insects to first light on the extended cover piece and then crawl under sloping panel 2 in search of attractant means 4. When a cover piece is used, additional adhesive and/or attractant may be applied to its surface facing the underside of sloping panel 2, and thus immobilize small insects where they make first contact in the cover piece adhesive and large insects when they contact adhesive material 3 with their back.

Figure 3:
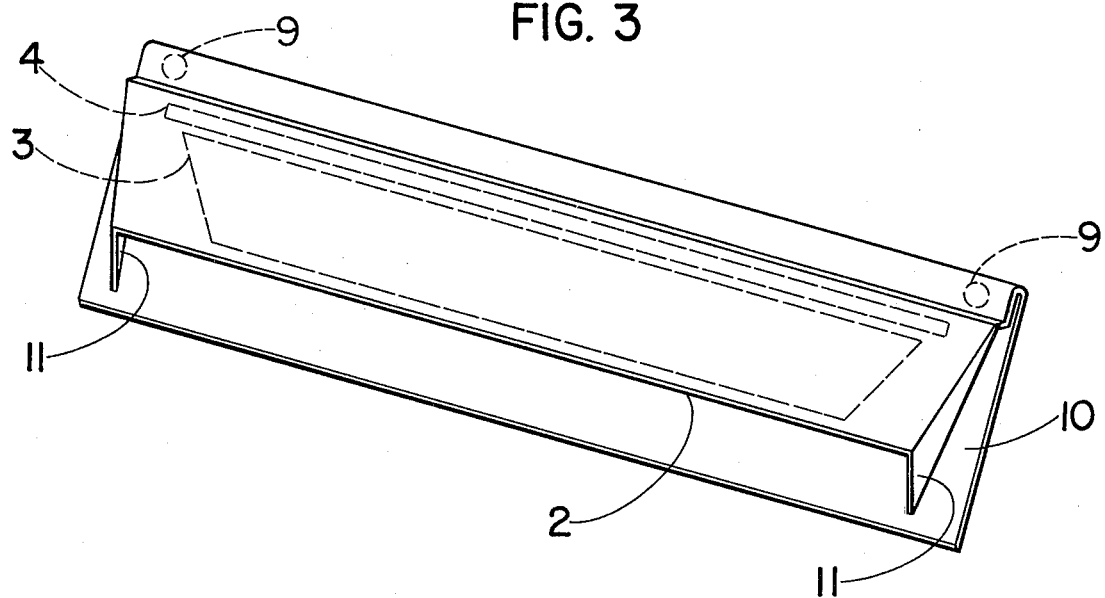
FIG. 3 is a perspective illustration of another embodiment of the insect trap of the invention which is constructed to fold down for minimum shipping and storage size.
Figure 4:
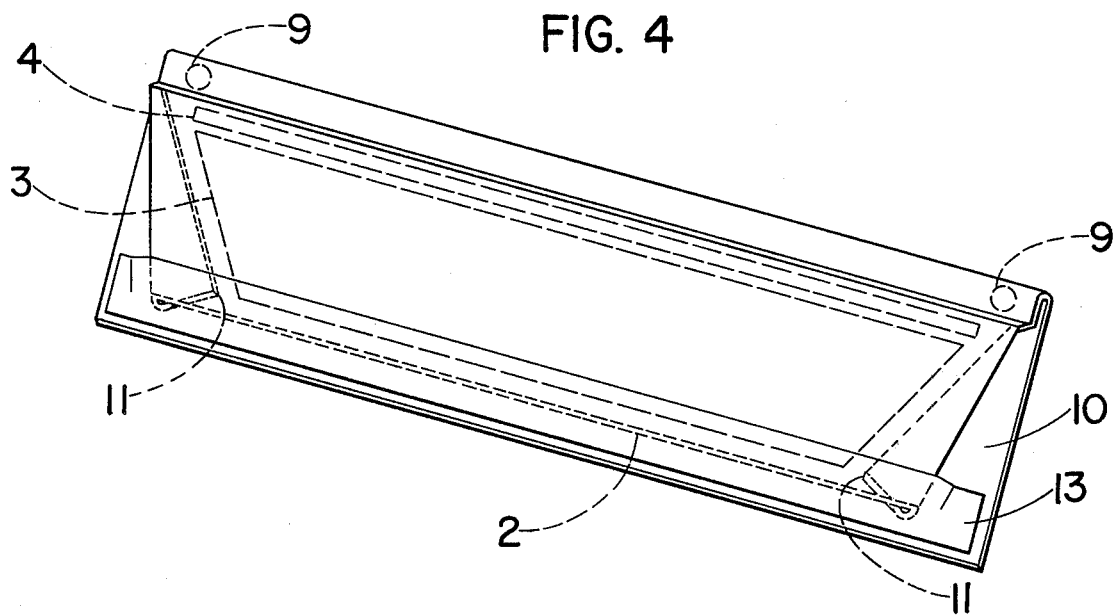
FIG. 4 is a perspective illustration of the embodiment of FIG. 3 showing the insect trap folded or collapsed down for shipment or storage.

Referring now to FIGS. 3 and 4, there is illustrated another embodiment of the invention which attracts and traps insects in the manner of the embodiment of FIGS. 1 and 2, but in which the sloping panel 2 may be pulled out for use as shown in FIG. 3 or folded down for storage as shown in FIG. 4.

The embodiment of the invention shown in FIGS. 3 and 4 is constructed by folding a sheet of heavy paper or other suitable material back on itself to form a base member 10 and sloping panel 2. As in FIGS. 1 and 2, adhesive material 3 and attractant means 4 are applied to the underside of sloping panel 2, and in use sloping panel 2 is held at a proper incline with base 10 by tabs 11 which are folded at a generally 90 degree angle on one or both ends of base 10 and/or sloping panel 2. If desired, suitable attachment means 9 may be applied to the back or outside surface of base 10 to allow the insect trap to be secured to a surface in the area of its use.

For storage, tabs 11 may be folded completely over to lie flat against their respective members and allow sloping panel 2 to fold down to a position parallel with base member 10. In the folded down position, the thickness of tabs 11 between sloping panel 2 and base 10 hold the inside surfaces of sloping panel 2 and base 10 apart to prevent adhesive material 3 and attractant means 4 from sticking the two surfaces together. It is within the scope of the invention to seal the opening between sloping panel 2 and base 10 with a removable adhesive strip or other suitable means 13 to effectively occlude the entrance between the two members and prevent dust or other detrimental elements from contacting adhesive material 3 and attractant means 4 during storage.

It is within the scope of the invention to construct the embodiment of FIGS. 3 and 4 from two or more pieces of heavy paper or other suitable material by attaching the pieces together as needed to form base member 10, sloping panel 2, and when required tabs 11.

Referring now to FIGS. 5, 6, and 7, there is illustrated yet another embodiment of the invention which operates under the general principles of the other embodiments shown, but which in addition may be expanded when needed.

The embodiment of FIG. 5 is constructed of heavy paper or other suitable material and provides a base member 10 over which a sloping panel 2 is secured. A spacer strip 12 supports sloping panel 2 and maintains a desired degree of slope or incline with base 10. Base 10 and sloping panel 2 may be fastened together at their junction in the lowest part of the slope by any means to prevent them from being unintentionally moved apart and altering the spacing and slope between the two members. As in the other embodiments shown, adhesive material 3 and attractant means 4 are applied to either one or both of the inside and facing surfaces of base 10 and sloping panel 2. When used in the folded orientation of FIG. 5, base 10 is laid upon, or secured to, a surface in the area of use and insects are attracted to enter the space between base 10 and sloping panel 2 where they contact adhesive material 3 and are immobilized.

When there is enough room on the surface to which the invention is applied for use, the effective trapping area in a given size of the embodiment of FIG. 5 may be doubled by pulling base 10 and sloping panel 2 apart and at a proper angle to spacer strip 12 as shown in FIG. 6 to place the adhesive and attractant coated surface of both base 10 and sloping panel 2 in a position inclined to and facing the surface 7 upon which the invention is placed for use as shown in FIG. 7. Attachment means 9 may be applied to the portion of spacer strip 12 and/or base 10 and sloping panel 2 in contact with surface 7 to secure the invention's location.

It is within the scope of the invention to cover all open edges between sloping panel 2 and base 10, and provide a port or other passageway means through any desired location in the structure to allow insects to crawl between base 10 and sloping panel 2. The use of this type of passageway will allow a removable adhesive cover or other suitable closure to be placed over the passageway to seal the invention during storage.

Several embodiments and variations in design have been shown and described to demonstrate the versatility of the invention. The features of any one embodiment may be applied to and used in combination with any other, and obviously many other embodiments are possible. It will be understood by those skilled in the art that various changes may be made and equivalents may be substituted for the elements thereof without departing from the true spirit and scope of the invention. In addition, many modifications may be made to adapt a particular situation or material to the teachings of the invention without departing from the essential teachings.

What is claimed as new and desired to be secured by letters patent is:

1. A trap for insects or other pests comprising: a panel having an adhesive surface, means supporting an edge of said panel away from a supporting surface so that said panel is disposed over and converges toward the supporting surface, and attractant in proximity to the portions of said panel nearest the supporting surface for means luring insects or pests to move under said panel and toward contact with said adhesive surface.

2. A trap as set forth in claim 1 including means for securing said panel to a supporting surface.

3. A trap as set forth in claim 1 including a base member disposed generally parallel with the plane of insect or pest travel and extending under said panel to provide a surface for insect or pest travel and protect the adhesive and said attractant means during storage.

4. A trap as set forth in claim 3 which includes a quantity of adhesive and/or attractant means applied to the said base member on the side facing the said adhesive surface or surfaces.

5. A trap for insects or other pests comprising: a panel having an adhesive surface inclined to and converging toward or with a base member over which insects or other pests may travel, spacer means between said panel and said base member disposed to maintain a desired angle and desired spacing between said base surface and adhesive surface, and attractant means in proximity to the portion of said panel nearest the supporting surface for luring target insects or pests to move between said adhesive and base surfaces and toward contact with the adhesive by a portion of their upper body.

6. A trap as set forth in claim 5 combination with a second panel having an inclined adhesive surface.

7. A trap as set forth in claim 5 in which said base member includes a quantity of adhesive and/or attractant means applied to its surface facing the said adhesive surface.

8. A trap as set forth in claim 5 which includes disengageable closure means for sealing desired openings between said panel adhesive surface and said base member during storage.

9. A trap as set forth in claim 5 in which said base member and said panel are flexibly joined, and in which said spacer means may be selectively disengaged to allow said panel to collapse to a position in close proximity to the base member for storage.

10. A trap as set forth in claim 9 in which said spacer means are hinged to fold to a position in close proximity to said base member and adhesive surface.

11. A trap as set forth in claim 7 in which said base member and said panel are flexibly joined whereby the base member may be moved from its position under and facing said adhesive surface to a position facing and inclined to the plane of insect or pest travel.

12. A trap as set forth in claim 11 including means for maintaining a desired angular disposition between the said surface of insect or pest travel and the said inclined base member and adhesive surface.

13. A trap for attracting and trapping insects or other pests consisting of a chamber having a surface which is inclined to and converges toward or with a surface opposite it, adhesive means being applied to said inclined surface above and facing said opposite surface, generally upright walls extending between said inclined adhesive surface and said opposite surface, said upright walls spacing one end of the inclined adhesive surface from the opposite surface, said chamber having an opening that allows insects or pests to move freely therethrough to the space between the inclined adhesive surface and opposite surface, and attractant means in proximity to the portion of said inclined surface nearest the opposite surface for enticing insects or pests to enter the chamber and move toward a low portion of the incline where they contact the adhesive surface.

14. A trap for attracting and trapping insects or other pests as set forth in claim 13 which includes a disengageable closure means sealing said passageway means to protect said adhesive and attractant means during storage.

15. A trap for attracting and trapping insects or other pests as set forth in claim 13 including attachment means for securing the chamber to a desired location.

16. A trap for attracting and trapping insects or other pests as set forth in claim 13 which includes a quantity of adhesive applied to the said opposite surface.

* * * * *